(12) United States Patent
Chatbri et al.

(10) Patent No.: US 11,328,001 B2
(45) Date of Patent: May 10, 2022

(54) EFFICIENT MATCHING OF DATA FIELDS IN RESPONSE TO DATABASE REQUESTS

(71) Applicant: Optum Services (Ireland) Limited, Dublin (IE)

(72) Inventors: Houssem Chatbri, Dublin (IE); Riccardo Mattivi, Dublin (IE); Ahmed Selim, Dublin (IE); James Philip Bauer, Eldersburg, MD (US)

(73) Assignee: Optum Services (Ireland) Limited, Dublin (IE)

( * ) Notice: Subject to any disclaimer, the term of this patent is extended or adjusted under 35 U.S.C. 154(b) by 0 days.

(21) Appl. No.: 16/915,072

(22) Filed: Jun. 29, 2020

(65) Prior Publication Data

US 2021/0406283 A1    Dec. 30, 2021

(51) Int. Cl.
*G06F 16/28* (2019.01)
*G06F 16/22* (2019.01)
*G06F 16/248* (2019.01)
*G06F 16/2455* (2019.01)

(52) U.S. Cl.
CPC .......... *G06F 16/284* (2019.01); *G06F 16/221* (2019.01); *G06F 16/2282* (2019.01); *G06F 16/248* (2019.01); *G06F 16/2456* (2019.01)

(58) Field of Classification Search
CPC .................................................... G06F 16/284
USPC ....................................................... 707/713
See application file for complete search history.

(56) References Cited

U.S. PATENT DOCUMENTS

| | | | |
|---|---|---|---|
| 7,103,838 B1 | 9/2006 | Krishnamurthy et al. | |
| 2012/0303663 A1* | 11/2012 | Asikainen | G06F 16/3347 707/780 |
| 2020/0184072 A1* | 6/2020 | Ikeda | G06F 11/34 |
| 2020/0250576 A1* | 8/2020 | Jagota | G06N 3/084 |

OTHER PUBLICATIONS

Antonio, Meraldo. "Word Embedding, Character Embedding and Contextual Embedding in BiDAF—An Illustrated Guide," Towards Data Science, Aug. 28, 2019, (20 pages). [Retrieved from the Internet Sep. 28, 2020]<URL: https://towardsdatascience.com/the-definitive-guide-to-bidaf-part-2-word-embedding-character-embedding-and-contextual-c151fc4f05bb>.

Le, Quoc et al. "Distributed Representations of Sentences and Documents," In International Conference On Machine Learning, Jan. 27, 2014, pp. 1188-1196. [Retrieved from the Internet Sep. 28, 2020]<URL: http://proceedings.mlr.press/v32/le14.pdf>.

(Continued)

*Primary Examiner* — Syling Yen
(74) *Attorney, Agent, or Firm* — Alston & Bird LLP

(57) ABSTRACT

There is a need for more accurate and more efficient database management operations. This need can be addressed by, for example, techniques for efficient matching of data fields in response to database queries. In one example, a method includes: for each input data field of a plurality of input data fields, generating an per-field encoded representation of the input data field based on each per-character increment score for an occurred character in the input data field; performing the automated data field matching based on each per-field encoded representation for an input data field to generate one or more data field matching outputs; and causing display of the one or more data field matching determinations using a data field matching output interface.

17 Claims, 12 Drawing Sheets

(56) References Cited

OTHER PUBLICATIONS

Mikolov, Tomas et al. "Distributed Representations of Words and Phrases and Their Compositionality," In Advances In Neural Information Processing Systems, (2013), pp. 3111-3119. [Retrieved from the Internet Sep. 28, 2020]<URL: https://papers.nips.cc/paper/5021-distributed-representations-of-words-and-phrases-and-their-compositionality.pdf>.

Robertson, Sean. "NLP From Scratch: Classifying Names With a Character-Level RNN," PyTorch Tutorials 1.6.0. Documentation, (9 pages). [Article, Online], [Retrieved from the Internet Sep. 28, 2020]<URL: https://pytorch.org/tutorials/intermediate/char_rnn_classification_tutorial.html>.

Saif, Hassan et al. "Alleviating Data Sparsity For Twitter Sentiment Analysis," CEUR Workshop Proceedings (CEUR-WS. org), (2012), pp. 2-9. [Retrieved from the Internet Sep. 28, 2020]<URL: http://ceur-ws.org/Vol-838/paper_01.pdf>.

Sperr, Henning et al. "Letter N-Gram-Based Input Encoding For Continuous Space Language Models," In Proceedings of the Workshop On Continuous Vector Space Models and their Compositionality, Aug. 2013, pp. 30-39. [Retrieved from the Internet Sep. 28, 2020]<URL: https://www.aclweb.org/anthology/W13-3204.pdf>.

Zhu, Zhaocheng et al. "Context Aware Document Embedding," arXiv preprint arXiv:1707.01521v1. Jul. 5, 2017, (8 pages). [Retrieved from the Internet Sep. 28, 2020]<URL: https://arxiv.org/pdf/1707.01521.pdf>.

\* cited by examiner

1000

SELECT Customer.CustomerName and Business.IncorporationState
FROM Customer
INNER JOIN Business ON Customer.CustomerAddress = Business.BusinessAddress

FIG. 10A

SELECT Customer.CustomerName and Business.IncorporationState
FROM Customer
INNER JOIN Business ON Customer.CustomerAddress = Business.BusinessAddress
WITH MATCHTHRESSHOLD 0.99 __1051__

EFFICIENT MATCHING OF DATA FIELDS IN RESPONSE TO DATABASE REQUESTS

BACKGROUND

Various embodiments of the present invention address technical challenges related to performing database management operations that require performing data field matching and disclose various innovative techniques for improving efficiency and/or reliability of database management systems.

BRIEF SUMMARY

In general, embodiments of the present invention provide methods, apparatuses, systems, computing devices, computing entities, and/or the like for performing database management operations that require performing data field matching. Various embodiments of the present invention disclose techniques for consolidating (e.g., combining, matching and/or the like) data from input data fields across a plurality of databases, database tables and/or the like.

In accordance with one aspect, a method for performing automated data field matching across a plurality of input data fields is provided. In one embodiment, the method comprises, for each input data field of the plurality of input data fields, identifying one or more occurred characters associated with the input data field, determining a per-character frequency score for each occurred character of the one or more occurred characters across the plurality of input data fields based on a cross-field per-character frequency score of the occurred character across the plurality of input data fields and a total size of the plurality of input data fields, determining a per-character increment score for each occurred character of the one or more occurred characters across the plurality of input data fields based on the per-character frequency score of the occurred character and generating an per-field encoded representation of the input data field based on each per-character increment score for an occurred character of the one or more occurred characters; performing the automated data field matching based on each per-field encoded representation for an input data field of the plurality of input data fields to generate one or more data field matching outputs across the plurality of input data fields; and causing display of the one or more data field matching determinations using a data field matching output interface.

In accordance with another aspect, an apparatus comprising at least one processor and at least one memory, including computer program code, is provided. In one embodiment, the at least one memory and the computer program code may be configured to, with the processor, cause the apparatus to perform automated data field matching across a plurality of input data fields. In one embodiment, the computer program code is configured to, with the at least one processor, cause the apparatus to: for each input data field of the plurality of data fields, identify one or more occurred characters associated with the input data field, determine a per-character frequency score for each occurred character of the one or more occurred characters across the plurality of input data fields based on a cross-field per-character frequency score of the occurred character across the plurality of input data fields and a total size of the plurality of input data fields, determine a per-character increment score for each occurred character of the one or more occurred characters across the plurality of input data fields based on the per-character frequency score of the occurred character, and generate an per-field encoded representation of the input data field based on each per-character increment score for an occurred character of the one or more occurred characters; perform the automated data field matching based on each per-field encoded representation for an input data field of the plurality of input data fields to generate one or more data field matching outputs across the plurality of input data fields; and cause display of the one or more data field matching determinations using a data field matching output interface.

In accordance with yet another aspect, a computer program product is provided. The computer program product may comprise at least one computer-readable storage medium having computer-readable program code portions stored therein, the computer-readable program code portions comprising executable portions configured to perform automated data field matching across a plurality of input data fields. In one embodiment, the computer-readable code portions comprising executable portions may be configured to, for each input data field of the plurality of data fields, identify one or more occurred characters associated with the input data field, determine a per-character frequency score for each occurred character of the one or more occurred characters across the plurality of input data fields based on a cross-field per-character frequency score of the occurred character across the plurality of input data fields and a total size of the plurality of input data fields, determine a per-character increment score for each occurred character of the one or more occurred characters across the plurality of input data fields based on the per-character frequency score of the occurred character, and generate an per-field encoded representation of the input data field based on each per-character increment score for an occurred character of the one or more occurred characters; perform the automated data field matching based on each per-field encoded representation for an input data field of the plurality of input data fields to generate one or more data field matching outputs across the plurality of input data fields; and cause display of the one or more data field matching determinations using a data field matching output interface.

BRIEF DESCRIPTION OF THE DRAWINGS

Figure 1:
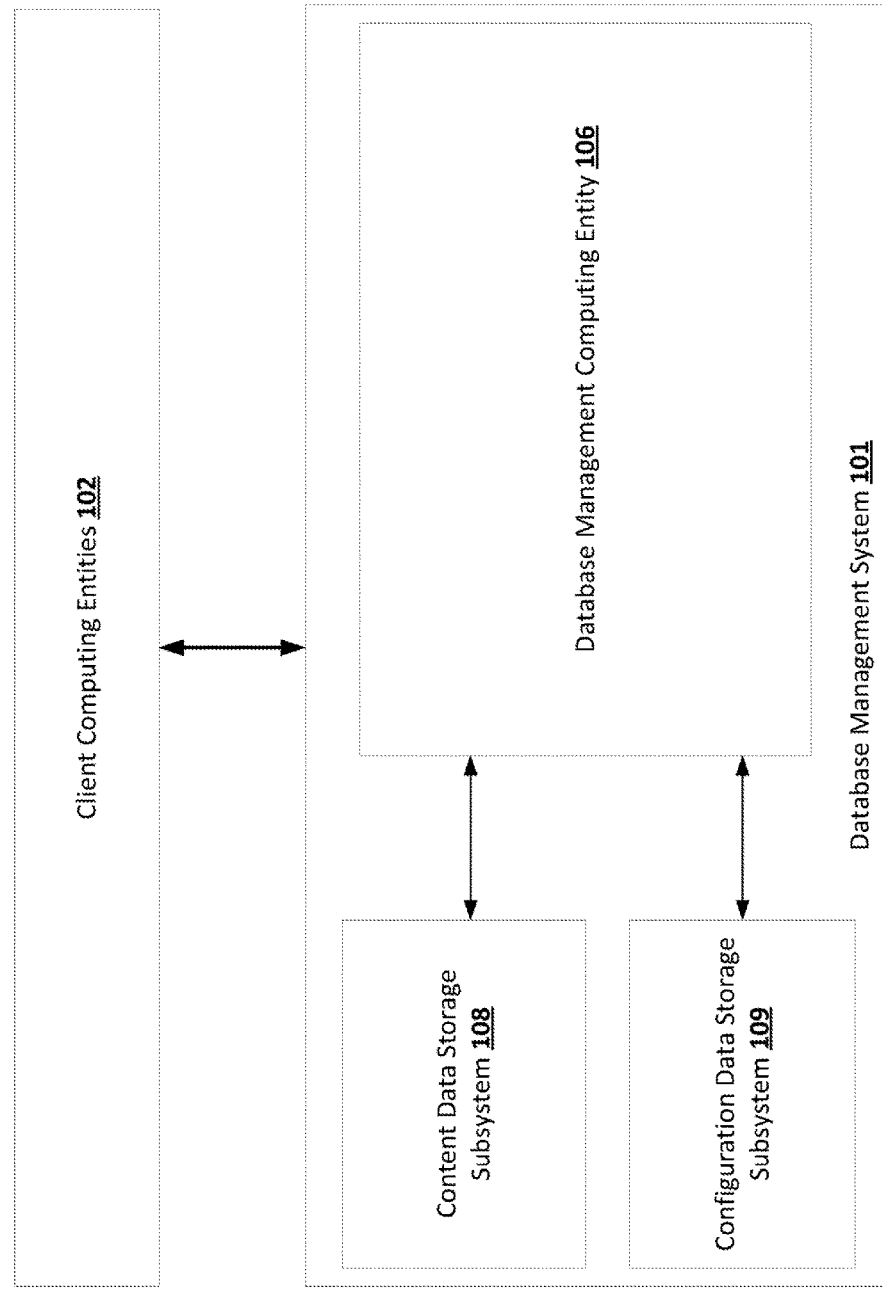

Having thus described the invention in general terms, reference will now be made to the accompanying drawings, which are not necessarily drawn to scale, and wherein:

FIG. 1 provides an exemplary overview of a system architecture that can be used to practice embodiments of the present invention.

Figure 2:
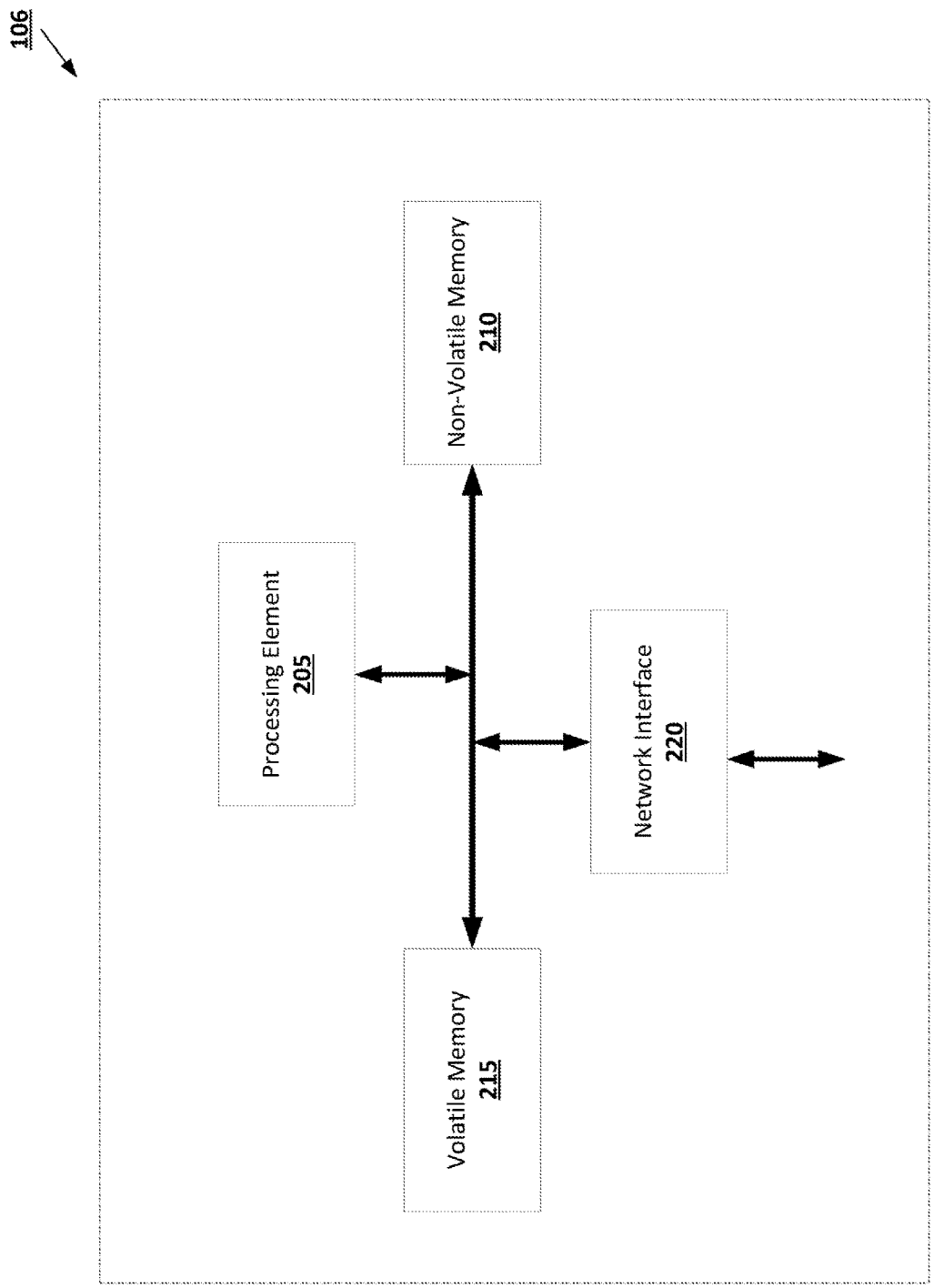

FIG. 2 provides an example database management computing entity in accordance with some embodiments discussed herein.

Figure 3:
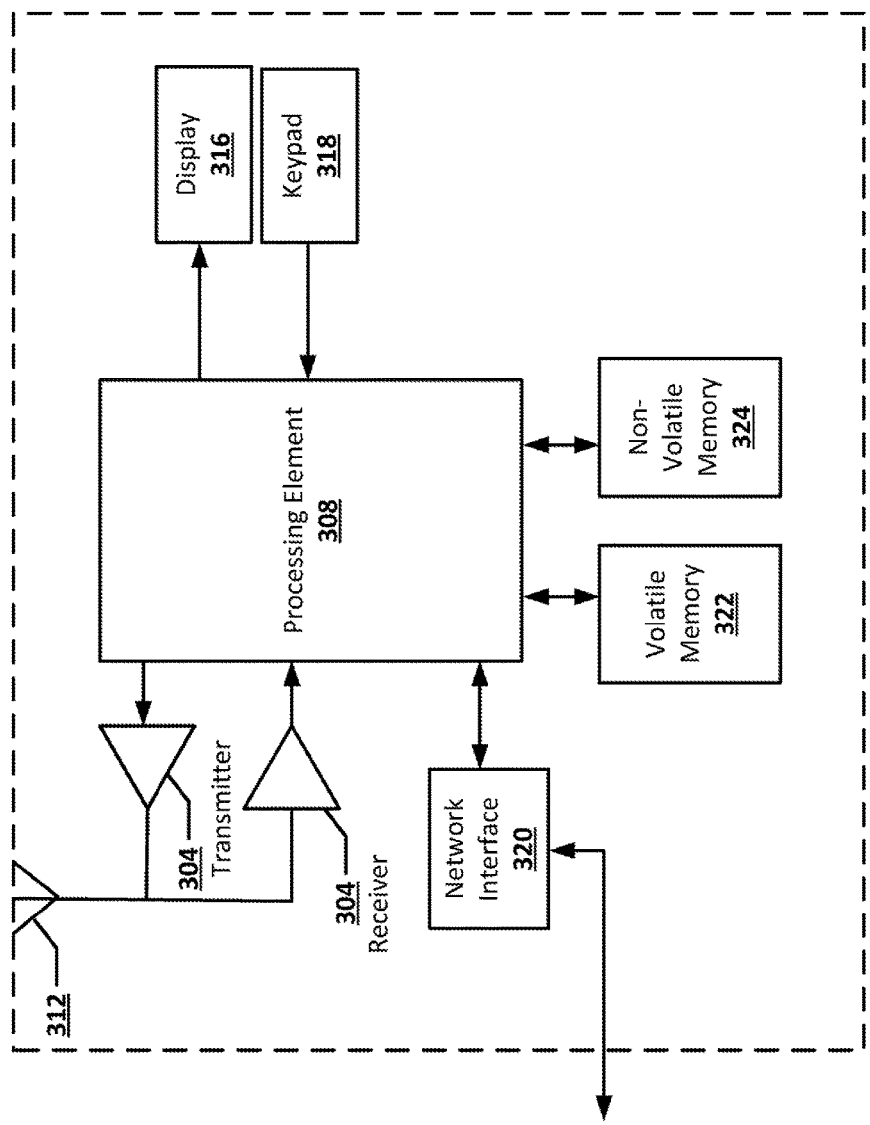

FIG. 3 provides an example client computing entity in accordance with some embodiments discussed herein.

Figure 4:
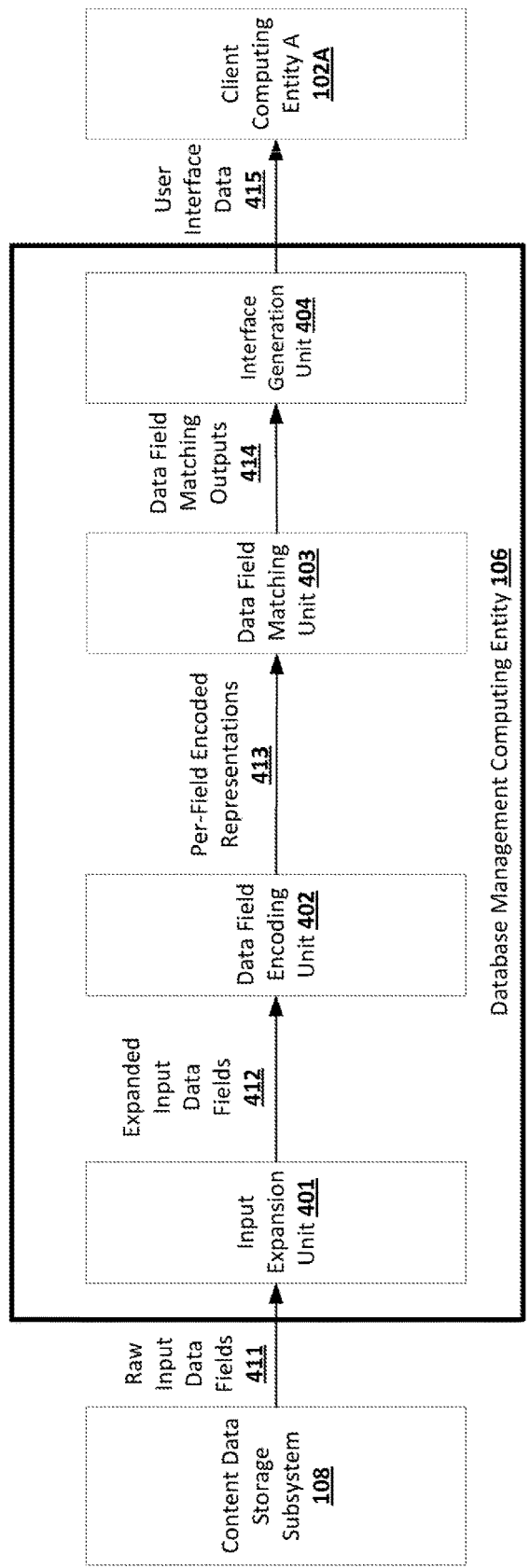

FIG. 4 provides an exemplary schematic of a system architecture for performing data field matching operations and generating user interface data in accordance with some embodiments discussed herein.

Figure 5:
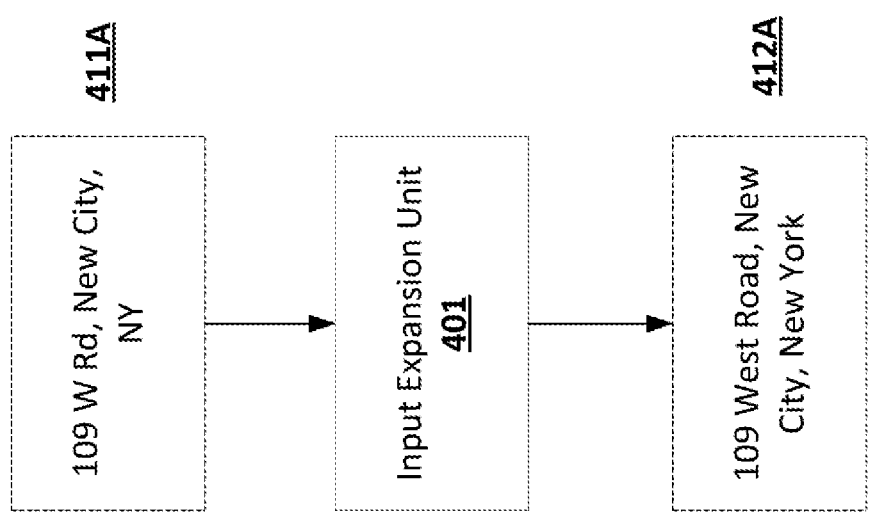

FIG. 5 provides an operational example of performing input expansion in accordance with some embodiments discussed herein.

Figure 6:
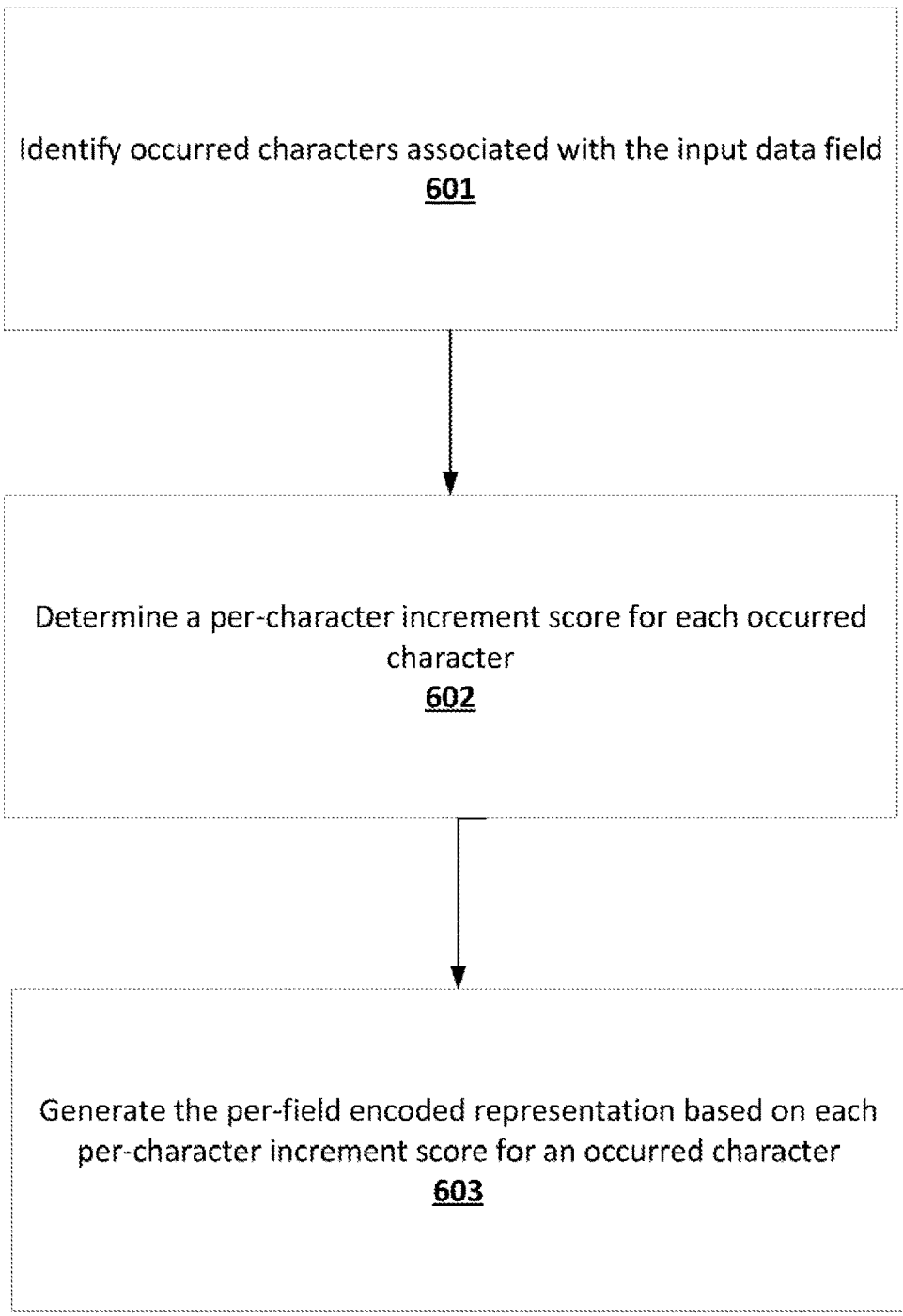

FIG. 6 provides a flowchart diagram illustrating an example process for generating per-field encoded representations by a data field encoding unit in accordance with some embodiments discussed herein.

Figure 7:
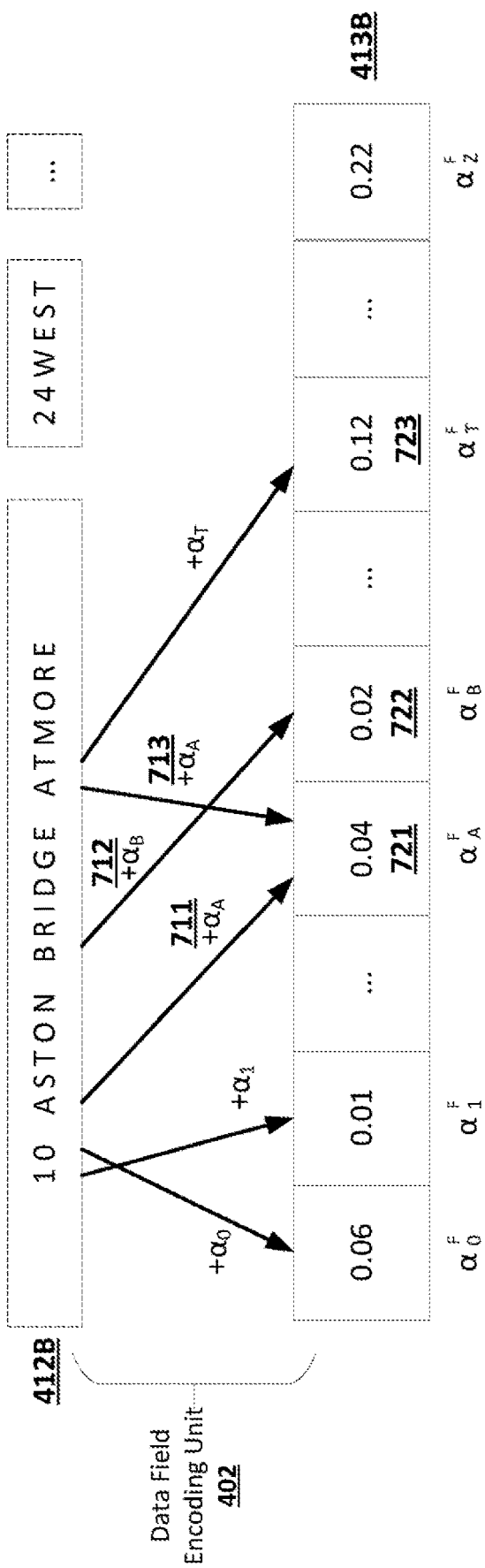

FIG. 7 provides an operational example of generating per-field encoded representations in accordance with some embodiments discussed herein.

Figure 8:
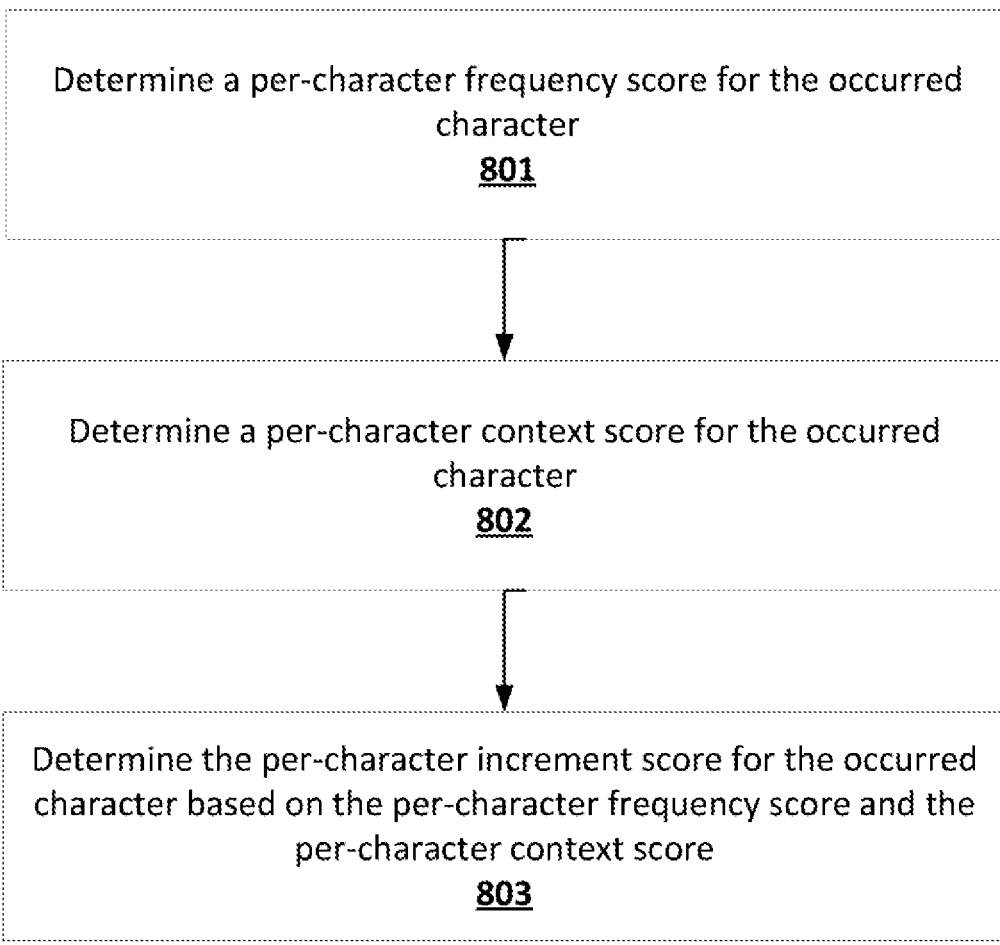

FIG. 8 provides a flowchart diagram of an example process for determining a per-character increment score for an occurred character in an input data field in accordance with some embodiments discussed herein.

Figure 9:
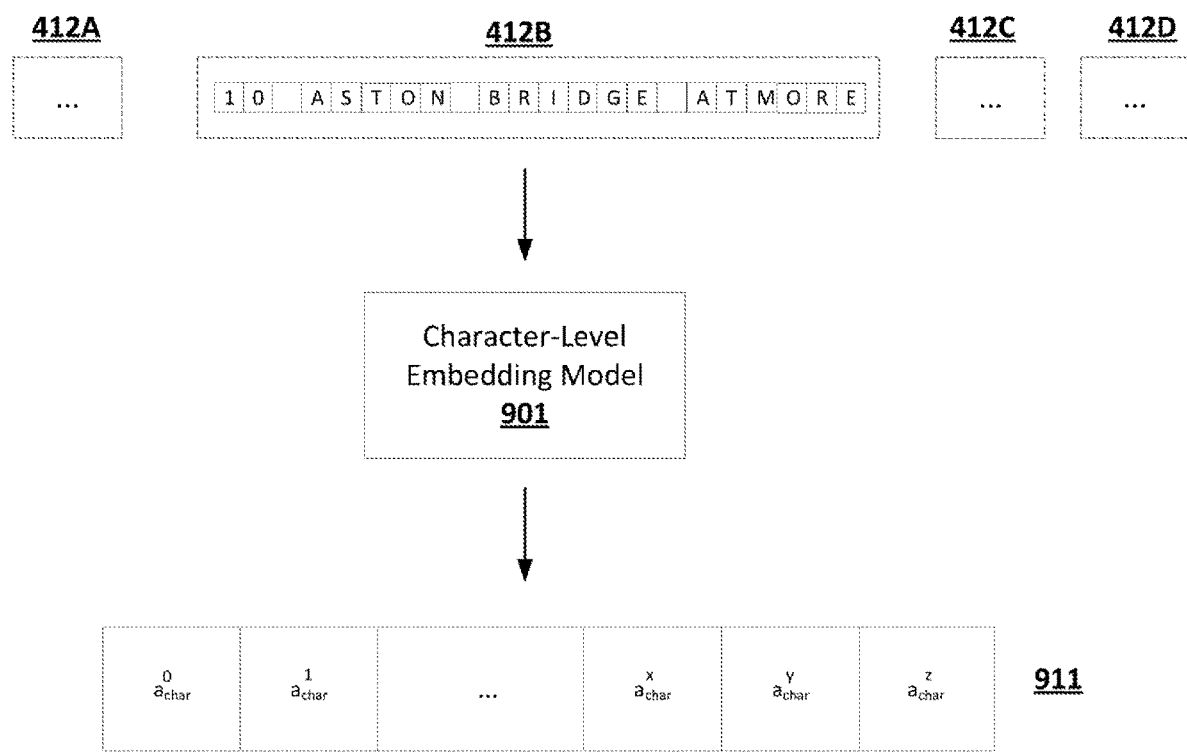

FIG. 9 provides an operational example of determining a per-character context score for an occurred character in an input data field using a character-level embedding model (e.g. a character to vector machine learning model, other Language Model and/or Natural Language Processing model/technique) in accordance with some embodiments discussed herein.

FIG. 10A provides an operational example of a non-probabilistic join operation in accordance with some embodiments discussed herein.

FIG. 10B provides an operational example of a probabilistic join operation in accordance with some embodiments discussed herein.

Figure 11:
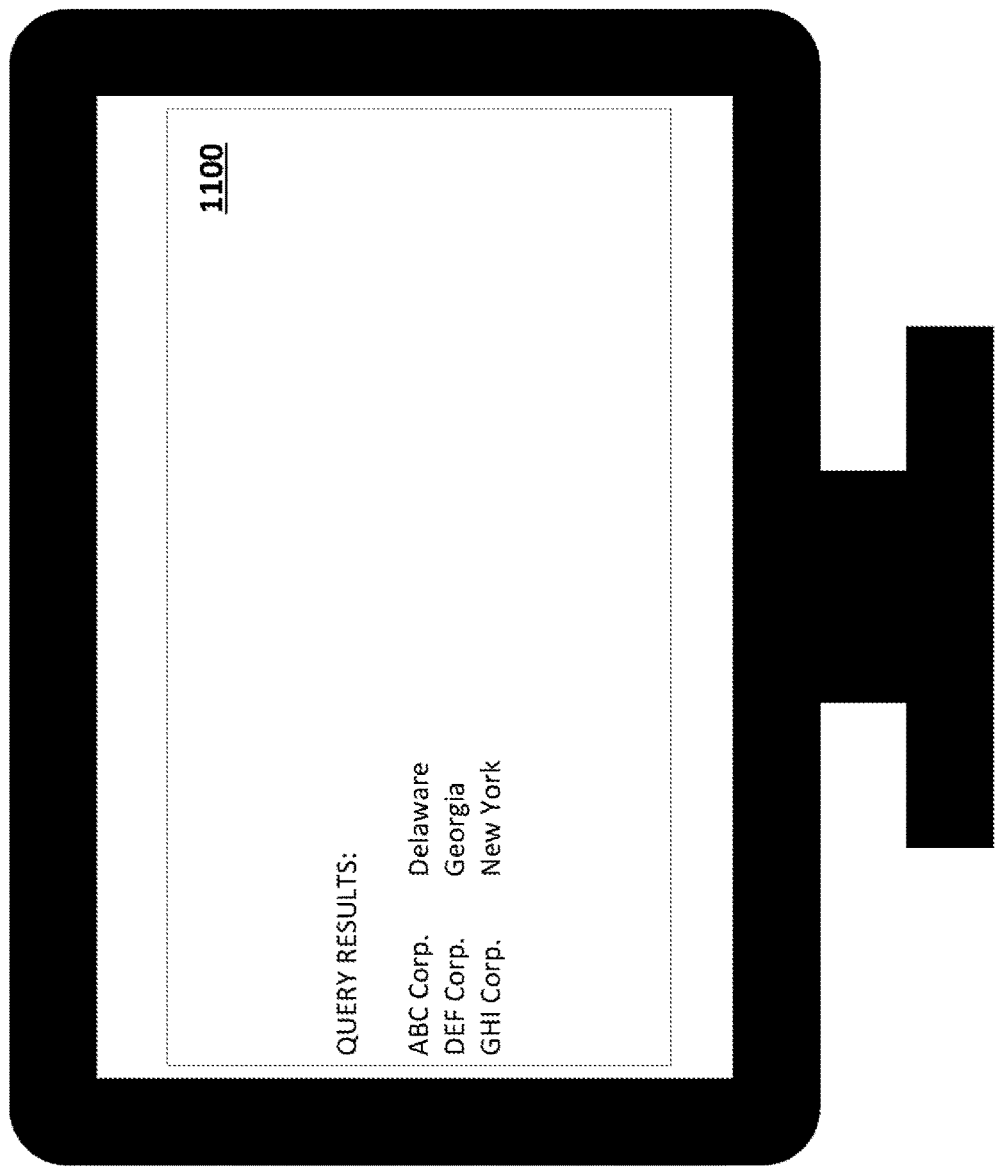

FIG. 11 provides an operational example of a query output user interface in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW

Various embodiments of the present invention disclose techniques for performing database operations that require data field matching operations that improve efficiency and/or reliability of performing such operations. By facilitating efficient and accurate data field matching operations, the noted embodiments of the present invention improve database management operations that require data field matching. Various embodiments of the present invention improve data retrieval efficiency in addition to data storage efficiency of various database management systems. Providing frequency-awareness and contextual-awareness in feature representations of input data fields improves accuracy of subsequent numerical operations and reduces the number of false positives in query results/outputs. Additionally, improved matching operations between input data fields enables the consolidation of related data across various databases and/or various database tables. This in turn reduces storage needs of various existing data storage systems. Furthermore, various embodiments of the present invention enable faster and more reliable retrieval of data in response to data queries, a functionality that in turn increases the efficiency and reliability of data retrieval operations and/or data query processing operations across various data storage systems, such as various data storage systems that act as a server devices in client-server data storage architectures.

Moreover, various embodiments of the present invention disclose techniques for more efficiently and reliably performing input expansion with respect to input data fields, generating numerical representations of the input data fields, and performing subsequent arithmetic operations (e.g., matching, similarity retrieval and/or the like) in order to generate query outputs and user interface data. The inventors have confirmed, via experiments and theoretical calculations, that various embodiments of the disclosed techniques improve efficiency and accuracy of database management relative to various state-of-the-art solutions.

By facilitating efficient and reliable database management operations, various embodiments of the present invention improve data retrieval efficiency as well as data storage efficiency of various data storage systems. Consolidating data from a plurality of input data fields facilitates more efficient storage of such data, for example by eliminating data redundancy and duplication across various databases and/or across various database tables. This in turn reduces storage needs of various existing data storage systems. Furthermore, generating numerical representations (e.g., feature vectors) of input data fields enables faster and more accurate subsequent arithmetic operations such as retrieval of the most significant portions of data in response to data queries and accurate data matching operations. This in turn increases the efficiency and reliability of data retrieval operations and/or data query processing operations across various data storage systems, such as various data storage systems that act as a server devices in client-server data storage architectures.

Accordingly, by utilizing some or all of the innovative techniques disclosed herein for performing database management, various embodiments of the present invention increase efficiency and accuracy of data storage operations, data retrieval operations, and/or query processing operations across various data storage systems, such as various data storage systems that are part of client-server data storage architectures. In doing so, various embodiments of the present invention make substantial technical contributions to the field of database systems and substantially improve state-of-the-art data storage systems.

II. DEFINITIONS OF CERTAIN TERMS

The term "input data field" may refer to a data object that describes a data attribute that contains an atomic unit of structured data in a database (e.g., a database value in a database table of a database, where the database value is associated with a row identifier and a column identifier). An input data field may comprise an input data string, such as an input data string that comprises one or more related words, numbers and/or combinations thereof. Each word or number in a input data string may comprise one or more characters. An example input data field is the address data field that comprises the input data string, "16 WEST RD." In this example, the input data string comprises a street number comprising the number "16," which further comprises the characters "1" and "6," and a street address comprising the words "WEST" and "RD," which further comprises the characters "W, "E," "S," "T," "R," and "D."

The term "character" may refer to a data object that describes an encoding defined by a character encoding system, such as an American Standard Code for Information Interchange (ASCII) character encoding system and/or a Unicode character encoding system. For example, with respect to the ASCII character encoding system, the characters defined by the noted character encoding system include "0," "1," "2," "3," "4," "5," "6," "7," "8," "9," "A," "B," "C," "W," "X," "Y," and "Z." In various embodiments, each character in a character encoding system may be represented as a scalar, vector, number/digit, letter, digital image/icon (e.g., emoji) and/or the like. In some embodiments, each character may correspond with a unique computer readable code. In an example embodiment, each character may be an ASCII code comprising a unique seven-bit or eight-bit code integer, a one-byte, two-byte, three-byte or four-byte Unicode integer and/or the like.

The term "occurred character" may refer to a data object that describes a character that occurs in a respective input data field. For example, an example input data may be the input data string "220 Smith Street," comprising a first input data value, a second input data value and a third input data value: "220," "Smith," and "Street", respectively. Each of the first input data value, the second input data value and the third input data value comprises one or more occurred characters. In the above example, the first input data value, "220" comprises the occurred characters "2," and "0" and defines a street number. The second input data value, "SMITH," comprises the occurred characters "S," "M," "I," "T," and "H." The third input data value, "STREET," comprises the occurred characters "S," "T," "R," and "E." The second and third input data values define a street address.

The term "per-character increment score" may refer to a data object that describes a predictive significance of each occurrence of a particular character within a dataset to performing data field matching operations across the data fields of the noted data set. The per-character increment score for a character may be determined using at least one of the per-character frequency score for the character and the per-character context score for the character.

The term "per-character frequency score" may refer to a data object that describes a measure of overall occurrence frequency of a corresponding character in a dataset containing a group of input data fields. In some embodiments, the frequency score of a corresponding character may be determined based the occurrence frequency of the occurred character in the dataset relative to the overall size of the dataset. In some embodiments, the per-character frequency score for a corresponding character in a group of input data fields may be determined based on a cross-field per-character frequency score of the occurred character across the group of input data fields and a total size of the group of input data fields.

The term "per-field per-character frequency score" may refer to a data object that describes a measure of occurrence frequency of an occurred character in an input data field. For example, given the input data field "APPLE", the per-field per-character frequency score for "A" may be one, the per-field per-character frequency score for "P" may be two, the per-field per-character frequency score for "L" may be one, and the per-field per-character frequency score for "E" may be one.

The term "per-field encoded representation" may refer to a data object describing a numerical representation (e.g., a feature vector) of a corresponding input data field based on occurrence of characters in the input data field. In some embodiments, the numerical representation may comprise an ordered histogram. An example numerical representation corresponding with an input data field that in turn comprises a plurality of occurred characters may comprise an N-dimensional vector, where N is the total number of candidate characters in an applicable character encoding system. In the noted example, each of the N values in the N-dimensional vector may describe the per-character increment score of a candidate character that corresponds to the vector value as well as the per-field per-character frequency score of the noted character with respect to the input data field. For example, given an input data field that consists of the word "ANNABEL", the per-field encoded representation may have a value of $2*a_A$ at the vector value corresponding to the character "A" (where $a_A$ is the per-character increment score for the character "A"), a value of $1*a_B$ at the vector value corresponding to the character "B" (where $a_B$ is the per-character increment score for the character "B"), a value of $1*a_E$ at the vector value corresponding to the character "E" (where $a_E$ is the per-character increment score for the character "E"), a value of $1*a_L$ at the vector value corresponding to the character "L" (where $a_L$ is the per-character increment score for the character "L"), a value of $2*a_N$ at the vector value corresponding to the character "N" (where $a_N$ is the per-character increment score for the character "N"), and a value of zero elsewhere.

The term "cross-field per-character frequency score" may refer to a data object that describes the occurrence frequency of a corresponding character across a plurality of input data fields in a dataset. For example, if the character "A" occurs two hundred and twenty times across a dataset, the cross-field per-character frequency score for the character "A" may be two hundred and twenty.

The term "character-level embedding model" may refer to a data object that describes operations and/or parameters of a machine learning model that is configured to process a dataset in order to determine a representation of a character that describes the occurrence context for the character relative to the characters that occur in the dataset. The character-level embedding model may be configured to extract features from input data fields to facilitate the performance of machine learning operations that are in turn configured to generate a per-field encoded representation (e.g., numerical representation and/or a feature vector representation) for each character. An example of a character-level embedding model is a convolutional neural network model, an autoencoder model (e.g. a regular autoencoder model, a variational autoencoder model, and/or the like), a convolutional-network-based encoder model, a recurrent-neural-network-based encoder model, a Natural Language Processing (NLP) model/technique such as a Language Model, a character to vector machine learning model, and/or the like.

The term "character context modeling data object" may refer to a data object that describes the output of a character-level embedding model with respect to each of a plurality of candidate characters defined by a character encoding system. The output of the character-level embedding model may comprise a per-candidate context score for each character that indicates a relational context of the character in a dataset with respect to each other character that has occurred in the dataset. For example, given an ASCII character encoding system, a character context modeling object may include a per-character context score for each character defined by the ASCII character encoding system.

The term "per-character context score" may refer to a data object that describes a relational context of a corresponding character in a dataset with respect to each other character that has occurred in the dataset. For example, the per-character context score for the character "A" may indicate that the noted character is unlikely to occur at the end of a word. As another example, the per-character context score for the character "X" may indicate that the noted character is unlikely to follow the character "Z".

The term "per-character context-aware frequency score" may refer to a data object that describes a per-field per-character frequency score of a corresponding character in a corresponding input data field as well as a per-character increment score of the corresponding character. For example, given an input data field that consists of the word "ANNABEL", the per-character context-aware frequency score for the character "A" may be $2*a_A$ (where $a_A$ is the per-character increment score for the character "A"), the per-character context-aware frequency score for the character "B" may be $1*a_B$ (where $a_B$ is the per-character increment score for the character "B"), the per-character context-aware frequency score for the character "E" may be $1*a_E$ (where $a_B$ is the per-character increment score for the character "E"), the per-character context-aware frequency score for the character "L" may be $1*at$ (where at is the per-character increment score for the character "L"), the per-character context-aware frequency score for the character "N" may be $2*a_N$ (where $a_N$ is the per-character increment score for the character "N"), and the per-character context-aware frequency score for every other character may be zero. In some embodiments, the per-field encoded representation for an input data field describes each per-character context-aware frequency score for a candidate character with respect to the noted input data field.

The term "input expansion rule" may refer to a data object that describes a set operations that are utilized to convert a raw input data field into an expanded input data field. A raw input data field may comprise input data strings including truncated values, word order errors, typographical errors, shorthand and/or the like. In some embodiments, an input expansion rule may be utilized to perform one or more operations on the raw input data field in order to reduce sparsity of a numerical representation of the raw input data field in a multi-dimensional embedding space and increase accuracy of numerical operations (e.g., cross-field distance measurements) with respect to input data fields. Exemplary input expansion rules and/or operations may include stemming, lemmatization techniques and/or the like. An example input expansion rule may convert the word "ST" in an input data field to "STREET".

The term "multi-dimensional embedding space" may refer to a data object that describes an N-dimensional space for modeling encoded representations of a group of terms, where each of the N dimensions of the N-dimensional space corresponds to a candidate character in a character encoding system. For example, given an ASCIIC character encoding system, a multi-dimensional embedding space may have a dimension corresponding to each ASCII character that is used to map the per-character context-aware frequency score of an encoded representation for an input data field with respect to a corresponding character associated with the noted dimension. Accordingly, the overall mapping of an encoded representation for an input data field represents each per-character context-aware frequency score represented by the noted encoded representation.

The term "cross-field distance measure" may refer to a data object that describes the distance between the mappings of two encoded representations in a multi-dimensional embedding space. The cross-field distance measure may be a measured distance between two input data fields (e.g., a primary data field and an associated secondary data field) in a multi-dimensional embedding space. In some embodiments, a cross-field distance operation may be determined using a distance between two per-field encoded representations, $V_1$ and $V_2$, where the distance may be calculated by utilizing the equation $$d(V_1, V_2) = \frac{1}{K} \sqrt{\sum_{k=0}^{K} (V_1[k] - V_2[k])^2},$$

where "$V_1$" and "$V_2$" are two feature vectors representing data from two input data fields (e.g., input data strings); and "K" is the number of dimensions for each vector. In various embodiments, a cross-field distance operation may be determined using similarity determination measures such as, but without limitation, cosine distance, Jaccard distance and/or the like.

The term "identity threshold" may refer to a data object that describes a threshold cross-field distance measure that, when exceeded by the cross-field distance measure for the two input data fields, should lead to an inference that the two input data fields are identical. For example, the identity threshold may be a cross-distance measure that is exceeded by ninety nine percent of the cross-field distance measures calculated using a particular multi-dimensional embedding space. As another example, the identity threshold may be a value defined by a database administrator and/or by a query parameter.

The term "data field matching output" may refer to a data object that describes an output of a process that involves calculating at least one cross-field distance measure between a group of input data fields. For example, the data field matching output may be an output that describes a determination about whether two input data fields are deemed equivalent, where the noted determination is determined by calculating a cross-field distance measure between the two input data fields. As another example, the data field matching output may be an output that describes the output of a database join operation (e.g., a relational join operation, such as a relational inner join operation, a relational outer join operation, a relational left join operation, a relational right join operation, and/or the like), where the database join operation includes an equivalence determination, and where the equivalence determinations are determined by calculating cross-field distance measures.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example system architecture 100 for performing database management operations. The architecture 100 includes a database management system 101 configured to receive requests from the client computing entities 102, process the requests to generate query outputs (e.g., data field matching outputs) and provide the query outputs to the client computing entities 102 (e.g., for providing and/or updating a user interface data). In some embodiments, database management system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The database management system 101 may include a database management computing entity 106, a content data storage subsystem 108 and a configuration data storage subsystem 109. The database management computing entity 106 may be configured to process the requests to generate query outputs and provide the query outputs to the client computing entities 102. The content data storage subsystem 108 may be configured to store at least a portion of structured input data utilized by the database management computing entity 106 to perform data management operations and tasks. The configuration data storage subsystem 109 may be configured to store at least a portion of operational data (e.g., trained model definition data and/or operational configuration data including operational instructions and parameters) utilized by the database management computing entity 106 to perform automated database management operations in response to database queries.

The content data storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The configuration data storage subsystem 109 may also include one or more storage units, such as multiple distributed storage units that are connected through a computer network. Each storage unit in the configuration data storage subsystem 109 may store at least one of one or more data assets and/or one or more data about the computed properties of one or more data assets. Moreover, each storage unit in the configuration data storage subsystem 109 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Database Management Computing Entity

FIG. 2 provides a schematic of a database management computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the database management computing entity 106 may also include one or more network interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the database management computing entity 106 may include or be in communication with one or more processing elements 205 (also referred to as processors, processing circuitry, and/or similar terms used herein interchangeably) that communicate with other elements within the database management computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the database management computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the database management computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the database management computing entity 106 with the assistance of the processing element 205 and operating system.

As indicated, in one embodiment, the database management computing entity 106 may also include one or more network interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the database management computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the database management computing entity 106 may include or be in communication with one or more input elements, such as a keyboard input, a mouse input, a touch screen/display input, motion input, movement input, audio input, pointing device input, joystick input, keypad input, and/or the like. The database management computing entity 106 may also include or be in communication with one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the database management computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the database management computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the database management computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the database management computing entity 106 and/or various other computing entities.

In another embodiment, the client computing entity 102 may include one or more components or functionality that are the same or similar to those of the database management computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

Described herein are various techniques for database management operations that require data field matching. Some of the disclosed techniques may utilize supervised machine learning models to perform database management operations (e.g., generate query outputs with respect to input data fields, generate user interface data and/or the like). Some of the described techniques utilize a particular combination of input expansion rules, data field encoding and character-level embedding models in which the output of input expansion rules is supplied as an input of data field encoding operations, which in turn is supplied as an input of and/or combined with a character-level embedding model. However, a person of ordinary skill in the art will recognize that input expansion operations, data field encoding operations and/or character-level embedding operations discussed herein may be performed using different combinations than the particular combinations described herein.

By facilitating efficient and accurate data field matching operations, various embodiments of the present invention improve database management operations that require data field matching. Various embodiments of the present invention improve data retrieval efficiency in addition to data storage efficiency of various database management systems. Providing frequency-awareness and contextual-awareness in feature representations of input data fields improves accuracy of subsequent numerical operations and reduces the number of false positives in query results/outputs. Additionally, improved matching operations between input data fields enables the consolidation of related data across various databases and/or various database tables. This in turn reduces storage needs of various existing data storage systems. Furthermore, various embodiments of the present invention enable faster and more reliable retrieval of data in response to data queries, a functionality that in turn increases the efficiency and reliability of data retrieval operations and/or data query processing operations across various data storage systems, such as various data storage systems that act as a server devices in client-server data storage architectures.

FIG. 4 provides a schematic representation of an example system 400 for performing data field matching operations and generating user interface data. The content data storage subsystem 108 provides raw input data fields 411 to the database management computing entity 106 for operations. The database management computing entity 106 may comprise one or more units configured to perform operations that lead to generating query outputs and user interface data. For example, the database management computing entity 106 may comprise a plurality of units each configured to perform an associated set of database management operations. The database management computing entity 106 may further describe other units such as query optimization units.

As illustrated in FIG. 4, the database management computing entity 106 comprises an input expansion unit 401 configured to generate expanded input data fields 412 from raw input data fields 411. An input data field may refer to a data object that describes a data attribute that contains an atomic unit of structured data in a database (e.g., a database value in a database table of a database, where the database value is associated with a row identifier and a column identifier). Exemplary techniques for performing input expansion are described in Subsection A of the present Section V of the present document.

An example raw input data field may be the address data field "10 WEST ST, N.Y.," comprising an input data string of the following input data values: "10," "WEST ST," "NY." In this example, each value comprises related characters defining an attribute/characteristic of the address data field. The characters "1" and "0" are related characters defining a street number, the characters "W," "E," "S," "T," "S," "T" are related characters defining a street address and the characters "N" and "Y" are related characters defining a city. A plurality of input data fields may define a dataset.

An input expansion rule may refer to a data object that describes a set operations that are utilized to convert a raw input data field into an expanded input data field. A raw input data field may comprise input data strings including truncated values, word order errors, typographical errors, shorthand and/or the like. In some embodiments, an input expansion rule may be utilized to perform one or more operations on the raw input data field in order to reduce sparsity of a numerical representation of the raw input data field in a multi-dimensional embedding space and increase accuracy of numerical operations (e.g., cross-field distance measurements) with respect to input data fields. Exemplary input expansion rules and/or operations may include stemming, lemmatization techniques and/or the like. An example input expansion rule may convert the word "ST" in an input data field to "STREET".

As further illustrated in FIG. 4, the database management computing entity 106 comprises a data field encoding unit 402 configured to generate per-field encoded representations 413 for the raw input data fields 411 (i.e., a per-field encoded representation for each raw input data field of the raw input data fields 411). Exemplary techniques for generating per-field encoded representations are described in Subsection B of the present Section V of the present document.

A per-field encoded representation may be a data object describing a numerical representation (e.g., a feature vector) of a corresponding input data field based on occurrence of characters in the input data field. In some embodiments, the numerical representation may comprise an ordered histogram. An example numerical representation corresponding with an input data field that in turn comprises a plurality of occurred characters may comprise an N-dimensional vector, where N is the total number of candidate characters in an applicable character encoding system. In the noted example, each of the N values in the N-dimensional vector may describe the per-character increment score of a candidate character that corresponds to the vector value as well as the per-field per-character frequency score of the noted character with respect to the input data field. For example, given an input data field that consists of the word "ANNABEL", the per-field encoded representation may have a value of $2*a_A$ at the vector value corresponding to the character "A" (where $a_A$ is the per-character increment score for the character "A"), a value of $1*a_B$ at the vector value corresponding to the character "B" (where $a_B$ is the per-character increment score for the character "B"), a value of $1*a_E$ at the vector value corresponding to the character "E" (where $a_E$ is the per-character increment score for the character "E"), a value of $1*a_L$ at the vector value corresponding to the character "L" (where at is the per-character increment score for the character "L"), a value of $2*a_N$ at the vector value corresponding to the character "N" (where $a_N$ is the per-character increment score for the character "N"), and a value of zero elsewhere.

As further illustrated in FIG. 4, the database management computing entity 106 comprises a data field matching unit 403 configured to generate data field matching outputs 414 based on the per-field encoded representations 413. Exemplary techniques for generating data field matching outputs are described in Subsection C of the present Section V of the present document.

A data field matching output may refer to a data object that describes an output of a process that involves calculating at least one cross-field distance measure between a group of input data fields. For example, the data field matching output may be an output that describes a determination about whether two input data fields are deemed equivalent, where the noted determination is determined by calculating a cross-field distance measure between the two input data fields. As another example, the data field matching output may be an output that describes the output of a database join operation (e.g., a relational join operation, such as a relational inner join operation, a relational outer join operation, a relational left join operation, a relational right join operation, and/or the like), where the database join operation includes an equivalence determination, and where the equivalence determinations are determined by calculating cross-field distance measures.

A. Performing Input Expansion

FIG. 5 provides an operational example of performing input expansion. An exemplary input expansion unit 401 may be configured to receive as input raw input data fields 411A from the content data storage subsystem 108. For example, the raw input data field 411A may be an address data field comprising the input string, "109 W Rd, New City, N.Y.", which in turn comprises the input data tokens "109," "W Rd," "New City," and "NY".

A raw input data field may comprise input data strings including truncated values, word order errors, typographical errors, shorthand and/or the like. In some embodiments, the input expansion unit 401 is configured to perform one or more operations (based on input expansion rules) on raw input data fields in order to reduce sparsity of a numerical representation of the raw input data field in a multi-dimensional embedding space. This increases the accuracy of arithmetic operations performed on the numerical representations of the input data fields such as data field matching operations. Exemplary input expansion rules and/or operations may include stemming, lemmatization techniques and/or the like.

For example, as depicted in FIG. 5, the input expansion unit 401 processes the raw input data fields 411A using a set of input expansion rules and generates an expanded input data field 412A. Returning to FIG. 5, the input expansion unit 401 may expand the input data values "W Rd" and "NY" from the raw input data field 411A, "109 W Rd, New City, N.Y." For example, the input expansion unit 401 may convert "W Rd" to "West Road" using a first input expansion rule and "NY" to "New York" using a second input expansion rule in order to generate an expanded input data field 412A, "109 West Road, New City, N.Y." As another example, the input expansion unit 401 may convert "W" to "West" using a first input expansion rule, "Rd" to "Road" using a second input expansion rule, and "NY" to "New York" using a second input expansion rule in order to generate an expanded input data field 412A, "109 West Road, New City, N.Y."

B. Generating Per-Field Encoded Representations

FIG. 6 is a flowchart diagram illustrating an example process for generating per-field encoded representations by a data field encoding unit 402. The process depicted in FIG. 6 begins at step/operation 601 when the data field encoding unit 402 identifies occurred characters associated with an input data field. As discussed above, an occurred character may refer to a data object that describes a character that occurs in an input data field.

At step/operation 602, the data field encoding unit 402 may determine a per-character increment score for each occurred character. The per-character increment score for an occurred character may refer to a data object that describes a predictive significance of each occurrence of the occurred character within a dataset to performing data field matching operations across the data fields of the noted data set. The per-character increment score for the occurred character may be determined using at least one of the per-character frequency score for the occurred character and the per-character context score for the occurred character.

In some embodiments, the per-character increment score for an occurred character char (i.e., $\alpha_{char}$) may be determined using operations described by the below equation:

$$\alpha_{char} = \alpha_{char}^{F} \times \alpha_{char}^{C} \qquad \text{Equation 1}$$

In Equation 1: "$\alpha_{char}^{F}$" is the per-character frequency score for the occurred character char, "$\alpha_{char}^{C}$" is the per-candidate context score for the occurred character char, and "$\alpha_{char}$" is the per-character increment score for the occurred character char.

In some embodiments, the per-character frequency score for a character char may be determined using operations described by the below equation:

$$\alpha_{char}^{F} = 1 - \frac{1}{|data|} \sum_{i=1}^{N} f_i \qquad \text{Equation 2}$$

In Equation 2, "$\alpha_{char}^{F}$" is the per-character frequency score for the character char, "|data|" is the total number of characters in a dataset comprising a group of N input data fields, "i" is an index variable that iterates over the N input data fields, "N" describes the number of input data fields in the dataset, "$f_i$" is the per-field per-character frequency score for the character char in the data field i, and $\sum_{i=1}^{N} f_i$ is the cross-field per-character frequency score for the character char in the dataset.

FIG. 8 is a flowchart diagram of an example process for determining a per-character increment score for an occurred character by the data field encoding unit 402. The process depicted in FIG. 8 begins at step/operation 801 when the data field encoding unit 402 determines a per-character frequency score for each occurred character. A per-character frequency score a data object that describes a measure of overall occurrence frequency of a corresponding character in a dataset containing a group of input data fields. In some embodiments, the frequency score of a corresponding character may be determined based the occurrence frequency of the occurred character in the dataset relative to the overall size of the dataset. In some embodiments, the per-character frequency score for a corresponding character in a group of input data fields may be determined based on a cross-field per-character frequency score of the occurred character across the group of input data fields and a total size of the group of input data fields.

At step/operation 802, the data field encoding unit 402 determines a per-character context score for the occurred character. The data field encoding unit 402 may utilize a character-level embedding model to determine a per-character context score for each occurred character. The character-level embedding model may be a machine learning model that is configured to process a dataset in order to determine a representation of a character that describes the occurrence context for the character relative to the characters that occur in the dataset. The character-level embedding model may be configured to extract features from input data fields to facilitate the performance of machine learning operations that are in turn configured to generate a per-field encoded representation (e.g., numerical representation and/or a feature vector representation) for each character. An example of a character-level embedding model is a convolutional neural network model, an autoencoder model (e.g., a regular autoencoder model, a variational autoencoder model, and/or the like), a convolutional-network-based encoder model, a recurrent-neural-network-based encoder model, a character to vector machine learning model, and/or the like.

FIG. 9 provides an operational example for determining a per-character context score for an occurred character using a character-level embedding model 901 by the data field encoding unit 402. Given the expanded input data field 412B, the data field encoding unit 402 may utilize the character-level embedding model 901 (e.g., a convolutional neural network model, an encoder model and/or the like) to determine the character context modeling data object 911 that describes the per-character context score for each occurred character of a set of characters. Each per-character context score may reflect a relational context with respect to other characters in the dataset, in this example a relational context with respect to other characters used in the data set that comprises the expanded input data fields 412A, 412C and 412D. For example, the per-character context score for the occurred character "A" may reflect how common the character is in the dataset that comprises the expanded data fields 412A, 412B, 412C and 412D in comparison to other characters in the dataset.

Returning to FIG. 8, at step/operation 803, the data field encoding unit 402 determines a per-character increment score for the occurred character based on the per-character frequency score for the occurred character and the per-character context score for the occurred character. In some embodiments, the data field encoding unit 402 combines (e.g., adds, multiplies, performs a weighted addition of, and/or the like) the per-character frequency score for the occurred character and the per-character context score for the occurred character to determine the per-character increment score for the occurred character.

Returning to FIG. 6, at step/operation 603, the data field encoding unit 402 generates the per-field encoded representation for the input data field based on each per-character increment score for an occurred character. The per-field encoded representation may include the per-character context-aware frequency score for each candidate character with respect to the input data field, where the per-character context aware frequency score for a candidate character is determined by combining (e.g., by multiplying) the per-field per-character frequency score for the candidate character in the input data field and the per-character increment score for the candidate character (e.g., by n times incrementing the value for character char in the per-field encoded representation of input data field i, where the value of n is determined based on the per-character context aware frequency score for the character char in the input data field i, and where the magnitude of each increment is determined based on the per-character increment score for the character char char). In some embodiments, the data field encoding unit 402 combines (e.g., in an ordered histogram) each per-character context aware frequency score for a candidate character with respect to the input data field in order to generate the encoded representation of the input data field.

FIG. 7 provides an operational example for generating a per-field encoded representation 413B for an expanded input data field 412B by the data field encoding unit 402. As depicted in FIG. 7, the data field encoding unit 402 increments the value for each character char by an increment magnitude that is equal to $a_{char}*n_{char}$, where $a_{char}$ is the per-character increment score for the character char and flaw is the per-character per-field frequency score of the character char in the expanded input data field 412B.

For example, given that the character "A" is associated with an occurrence frequency of two and has a per-character increment score 711 of 0.2, the value 721 of the character "A" in the per-field encoded representation 413B is 2*0.2=0.4. As another example, given that the character "B" is associated with an occurrence frequency of one and has a per-character increment score 712 of 0.2, the value 722 of the character "B" in the per-field encoded representation 413B is 1*0.2=0.2. As yet another example, given that the character "T" is associated with an occurrence frequency of two and has a per-character increment score 713 of 0.6, the value 723 of the character "T" in the per-field encoded representation 413B is 2*0.06=0.12.

C. Generating Data Field Matching Outputs

A data field matching output 414 may be an output of a process that involves calculating at least one cross-field distance measure between a group of input data fields. For example, the data field matching output may be an output that describes a determination about whether two input data fields are deemed equivalent, where the noted determination is determined by calculating a cross-field distance measure between the two input data fields. As another example, the data field matching output may be an output that describes the output of a database join operation (e.g., a relational join operation, such as a relational inner join operation, a relational outer join operation, a relational left join operation, a relational right join operation, and/or the like), where the database join operation includes an equivalence determination, and where the equivalence determinations are determined by calculating cross-field distance measures.

In some embodiments, to perform data field matching operations, the data field matching unit 403 may perform numerical operations configured to determine similarity of two or more input data fields based on the two or more per-field encoded representations of those input data fields. For example, to determine a similarity measure for two input data fields, the data field matching unit 403 may compute a measure of distance between the mappings of the per-field encoded representations of the two input data fields in a multi-dimensional embedding space.

A multi-dimensional embedding space may be an N-dimensional space for modeling encoded representations of a group of terms, where each of the N dimensions of the N-dimensional space corresponds to a candidate character in a character encoding system. For example, given an ASCII character encoding system, a multi-dimensional embedding space may have a dimension corresponding to each ASCII character that is used to map the per-character context-aware frequency score of an encoded representation for an input data field with respect to a corresponding character associated with the noted dimension. Accordingly, the overall mapping of an encoded representation for an input data field represents each per-character context-aware frequency score represented by the noted encoded representation.

A cross-field distance measure may describe the distance between the mappings of two encoded representations in a multi-dimensional embedding space. The cross-field distance measure may be a measured distance between two input data fields (e.g., a primary data field and an associated secondary data field) in a multi-dimensional embedding space. In some embodiments, a cross-field distance operation may be determined using a distance between two per-field encoded representations, $V_1$ and $V_2$, where the distance may be calculated by utilizing the equation $$d(V_1, V_2) = \frac{1}{K}\sqrt{\sum_{k=0}^{K}(V_1[k]-V_2[k])^2},$$

where "$V_1$" and "$V_2$" are two feature vectors representing data from two input data fields (e.g., input data strings); and "K" is the number of dimensions for each vector. In various embodiments, a cross-field distance operation may be determined using similarity determination measures such as, but without limitation, cosine distance, Jaccard distance and/or the like.

Once the data field matching outputs 414 are generated, an interface generation unit 404 may be configured to generate user interface data 415 based on the data field matching outputs 414 and provide the user interface data 415 to a client computing entity 102. FIG. 11 provides an operational example of a query output user interface 1100 that includes query results produced based on data field matching outputs. The query results depicted in the query output user interface 1100 may correspond to the results of at least one of the non-probabilistic join operation 1000 of FIG. 10A or the probabilistic join operation 1050 of FIG. 10B, which are described below in Subsection D of the present Section V of the present document.

D. Probabilistic Join Operations

As described above, an example application of the data field matching concepts of the present invention is to facilitate evaluating equivalence between data fields as part of performing join operations. By utilizing the concepts of the present invention, the database management computing entity 106 may detect the equivalence between text string fields despite deviations between those text string fields caused by spelling errors and/or by stylistic choices. For example, the database management computing entity 106 may detect that the string "Aple st," is equivalent to string "APPLE STREET". This in turn increases both the operational efficiency of performing database join operations by removing the need for performing field normalization operations prior to performing those join operations as well as the operational reliability of performing database join operations.

In some embodiments, various embodiments of the present invention can be used to support at least two types of database join operations: non-probabilistic join operations and probabilistic join operations. Unlike non-probabilistic join operations, probabilistic join operations may be associated with (e.g., may specify) a deviation tolerance parameter which can in turn be used to generate the identity threshold used to perform at least some aspects of the data field matching concepts of the present invention. An operational example of a non-probabilistic join operation 1000 is depicted in FIG. 10A, while an operational example of a probabilistic join operation 1050 is depicted in FIG. 10B. As depicted in FIG. 10B, the non-probabilistic join operation specifies a deviation tolerance parameter of 99% using the operation segment 1051. Based on the specified deviation tolerance parameter, the database management computing entity 106 may determine that two data fields are equivalent if the cross-field distance measure between the noted two data fields falls within the 1% least of a maximal cross-field distance measure as defined by the hyper-parameters of a corresponding multi-dimensional embedding space.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for performing automated data field matching across a plurality of input data fields, the computer-implemented comprising:
for each input data field of the plurality of input data fields:
identifying, by a processor, one or more occurred characters associated with the input data field, wherein the plurality of input data fields comprise one or more primary data fields associated with a primary relational database table and one or more secondary data fields associated with a secondary relational database table,
determining, by the processor, a per-character frequency score for each occurred character of the one or more occurred characters across the plurality of input data fields based at least in part on a cross-field per-character frequency score of the occurred character across the plurality of input data fields and a total size of the plurality of input data fields,
determining, by the processor, a per-character increment score for each occurred character of the one or more occurred characters across the plurality of input data fields based at least in part on the per-character frequency score of the occurred character, and
generating, by the processor, an per-field encoded representation of the input data field based at least in part on each per-character increment score for an occurred character of the one or more occurred characters;
performing, by the processor, the automated data field matching based at least in part on each per-field encoded representation for an input data field of the plurality of input data fields to generate one or more data field matching outputs across the plurality of input data fields, wherein (a) performing the automated data field matching comprises performing a relational join operation of the primary relational database table and the secondary relational database table with respect to a primary relational database column that is associated with the one or more primary data fields and a secondary relational database column that is associated with the one or more secondary data fields in order to generate a joined primary relational database table, (b) the one or more data field matching outputs are determined based at least in part on the joined primary relational database, and (c) performing the relational join operation comprises, for each data field pair of a plurality of data field pairs that comprises a primary data field of the one or more primary data fields and a secondary data field of the one or more secondary data fields, determining whether a cross-field distance measure between the per-field encoded representation of the primary data field associated with the data field pair and the secondary data field associated with the data field pair exceeds an identity threshold; and
providing, by the processor and using a data field matching output interface, the one or more data field matching determinations for display.

2. The computer-implemented method of claim 1, wherein determining the per-character increment score for an occurred character of the one or more occurred characters that is associated with an input data field of the plurality of input data fields further comprises:
determining a per-character context score for the occurred character based at least in part on a cross-character context modeling data object, wherein: (i) the cross-character context modeling data object comprises the per-candidate context score for each candidate character of a plurality of candidate characters, (ii) the plurality of candidate characters comprise the one or more occurred characters, and (iii) the cross-character context modeling data object is generated by processing the plurality of input data fields using a character-level embedding model;
determining the per-character increment score based at least in part on the per-character frequency score of the occurred character and the per-character context score of the occurred character.

3. The computer-implemented method of claim 1, wherein generating the per-field encoded representation for an input data field of the plurality of input data fields further comprises:
for each occurred character of the one or more occurred characters that are associated with the input data field, generating a per-character context-aware frequency score with respect to the input data field based at least in part on the per-character increment score for the occurred character and a per-field per-character frequency score for the occurred character within the input data field;

determining an ordered histogram that comprises an ordered description of each per-character context-aware frequency score for an occurred character of the one or more occurred characters; and generating the per-field encoded representation based at least in part on the ordered histogram.

4. The computer-implemented method of claim 1, wherein generating the plurality of input data fields comprises:

identifying a plurality of raw input data fields;

for each raw input data field of the plurality of raw input data fields, generating an expanded data field based at least in part on one or more input expansion rules; and generating the plurality of input data fields based at least in part on each expanded data field for a raw input data field of the plurality of raw input data fields.

5. The computer-implemented method of claim 1, wherein each cross-field distance measure for a data field pair of the plurality of data field pairs is determined based at least in part on a distance similarity measure of the per-field encoded representation of the primary data field associated with the data field pair and the secondary data field associated with the data field pair in a multi-dimensional embedding space associated with the plurality of input data fields.

6. The computer-implemented method of claim 1, wherein:

the relational join operation is a probabilistic join operation associated with a deviation tolerance parameter, and the identity threshold is determined based at least in part on the deviation tolerance parameter.

7. The computer-implemented method of claim 1, wherein the one or more data field matching outputs describe one or more query outputs associated with a relational query related to the joined relational database table.

8. An apparatus for performing automated data field matching across a plurality of input data fields, the apparatus comprising at least one processor and at least one memory including program code, the at least one memory and the program code configured to, with the processor, cause the apparatus to at least:

for each input data field of the plurality of input data fields:

identify one or more occurred characters associated with the input data field, wherein the plurality of input data fields comprise one or more primary data fields associated with a primary relational database table and one or more secondary data fields associated with a secondary relational database table, determine a per-character frequency score for each occurred character of the one or more occurred characters across the plurality of input data fields based at least in part on a cross-field per-character frequency score of the occurred character across the plurality of input data fields and a total size of the plurality of input data fields, determine a per-character increment score for each occurred character of the one or more occurred characters across the plurality of input data fields based at least in part on the per-character frequency score of the occurred character, and generate an per-field encoded representation of the input data field based at least in part on each per-character increment score for an occurred character of the one or more occurred characters;

perform the automated data field matching based at least in part on each per-field encoded representation for an input data field of the plurality of input data fields to generate one or more data field matching outputs across the plurality of input data fields, wherein (a) performing the automated data field matching comprises performing a relational join operation of the primary relational database table and the secondary relational database table with respect to a primary relational database column that is associated with the one or more primary data fields and a secondary relational database column that is associated with the one or more secondary data fields in order to generate a joined primary relational database table, (b) the one or more data field matching outputs are determined based at least in part on the joined primary relational database, and (c) performing the relational join operation comprises, for each data field pair of a plurality of data field pairs that comprises a primary data field of the one or more primary data fields and a secondary data field of the one or more secondary data fields, determining whether a cross-field distance measure between the per-field encoded representation of the primary data field associated with the data field pair and the secondary data field associated with the data field pair exceeds an identity threshold; and provide for display of the one or more data field matching determinations via a data field matching output interface.

9. The apparatus of claim 8, wherein determining the per-character increment score for an occurred character of the one or more occurred characters that is associated with an input data field of the plurality of input data fields further comprises:

determining a per-character context score for the occurred character based at least in part on a cross-character context modeling data object, wherein: (i) the cross-character context modeling data object comprises the per-candidate context score for each candidate character of a plurality of candidate characters, (ii) the plurality of candidate characters comprise the one or more occurred characters, and (iii) the cross-character context modeling data object is generated by processing the plurality of input data fields using a character-level embedding model;

determining the per-character increment score based at least in part on the per-character frequency score of the occurred character and the per-character context score of the occurred character.

10. The apparatus of claim 8, wherein generating the per-field encoded representation for an input data field of the plurality of input data fields further comprises:

for each occurred character of the one or more occurred characters that are associated with the input data field, generating a per-character context-aware frequency score with respect to the input data field based at least in part on the per-character increment score for the occurred character and a per-field per-character frequency score for the occurred character within the input data field;

determining an ordered histogram that comprises an ordered description of each per-character context-aware frequency score for an occurred character of the one or more occurred characters; and generating the per-field encoded representation based at least in part on the ordered histogram.

11. The apparatus of claim 8, wherein generating the plurality of input data fields comprises:

identifying a plurality of raw input data fields;

for each raw input data field of the plurality of raw input data fields, generating an expanded data field based at least in part on one or more input expansion rules; and generating the plurality of input data fields based at least in part on each expanded data field for a raw input data field of the plurality of raw input data fields.

12. The apparatus of claim 8, wherein each cross-field distance measure for a data field pair of the plurality of data field pairs is determined based at least in part on a similarity distance measure of the per-field encoded representation of the primary data field associated with the data field pair and the secondary data field associated with the data field pair in a multi-dimensional embedding space associated with the plurality of input data fields.

13. The apparatus of claim 8, wherein:

the relational join operation is a probabilistic join operation associated with a deviation tolerance parameter, and the identity threshold is determined based at least in part on the deviation tolerance parameter.

14. The apparatus of claim 9, wherein the one or more data field matching outputs describe one or more query outputs associated with a relational query related to the joined relational database table.

15. A computer program product for performing automated data field matching across a plurality of input data fields, the computer program product comprising at least one non-transitory computer-readable storage medium having computer-readable program code portions stored therein, the computer-readable program code portions configured to:

for each input data field of the plurality of input data fields:

identify one or more occurred characters associated with the input data field, wherein the plurality of input data fields comprise one or more primary data fields associated with a primary relational database table and one or more secondary data fields associated with a secondary relational database table, determine a per-character frequency score for each occurred character of the one or more occurred characters across the plurality of input data fields based at least in part on a cross-field per-character frequency score of the occurred character across the plurality of input data fields and a total size of the plurality of input data fields, determine a per-character increment score for each occurred character of the one or more occurred characters across the plurality of input data fields based at least in part on the per-character frequency score of the occurred character, and generate an per-field encoded representation of the input data field based at least in part on each per-character increment score for an occurred character of the one or more occurred characters;

perform the automated data field matching based at least in part on each per-field encoded representation for an input data field of the plurality of input data fields to generate one or more data field matching outputs across the plurality of input data fields, wherein (a) performing the automated data field matching comprises performing a relational join operation of the primary relational database table and the secondary relational database table with respect to a primary relational database column that is associated with the one or more primary data fields and a secondary relational database column that is associated with the one or more secondary data fields in order to generate a joined primary relational database table, (b) the one or more data field matching outputs are determined based at least in part on the joined primary relational database, and (c) performing the relational join operation comprises, for each data field pair of a plurality of data field pairs that comprises a primary data field of the one or more primary data fields and a secondary data field of the one or more secondary data fields, determining whether a cross-field distance measure between the per-field encoded representation of the primary data field associated with the data field pair and the secondary data field associated with the data field pair exceeds an identity threshold; and provide for display of the one or more data field matching determinations via a data field matching output interface.

16. The computer program product of claim 15, wherein determining the per-character increment score for an occurred character of the one or more occurred characters that is associated with an input data field of the plurality of input data fields further comprises:

determining a per-character context score for the occurred character based at least in part on a cross-character context modeling data object, wherein: (i) the cross-character context modeling data object comprises the per-candidate context score for each candidate character of a plurality of candidate characters, (ii) the plurality of candidate characters comprise the one or more occurred characters, and (iii) the cross-character context modeling data object is generated by processing the plurality of input data fields using a character-level embedding model;

determining the per-character increment score based at least in part on the per-character frequency score of the occurred character and the per-character context score of the occurred character.

17. The computer program product of claim 15, wherein generating the per-field encoded representation for an input data field of the plurality of input data fields further comprises:

for each occurred character of the one or more occurred characters that are associated with the input data field, generating a per-character context-aware frequency score with respect to the input data field based at least in part on the per-character increment score for the occurred character and a per-field per-character frequency score for the occurred character within the input data field;

determining an ordered histogram that comprises an ordered description of each per-character context-aware frequency score for an occurred character of the one or more occurred characters; and generating the per-field encoded representation based at least in part on the ordered histogram.

* * * * *